United States Patent [19]
Feltman

[11] Patent Number: 5,827,461
[45] Date of Patent: Oct. 27, 1998

[54] WIRELESS POLYMERIC TWIST TIE FORMING PROCESS

[75] Inventor: Michael P. Feltman, Worthington, Minn.

[73] Assignee: Bedford Industries, Inc., Worthington, Minn.

[21] Appl. No.: 722,391

[22] Filed: Sep. 30, 1996

Related U.S. Application Data

[62] Division of Ser. No. 290,338, Aug. 15, 1994, Pat. No. 5,607,748.

[51] Int. Cl.$^6$ ................................................... B29C 47/00
[52] U.S. Cl. ............................. 264/177.1; 264/173.16; 156/244.11; 156/244.12; 156/244.25
[58] Field of Search ........................... 264/172.12, 177.1, 264/177.17, 172.1, 173.16; 156/224.11, 244.25, 244.12

[56] References Cited

U.S. PATENT DOCUMENTS

| | | | |
|---|---|---|---|
| 3,290,854 | 12/1966 | MacMurray | 53/14 |
| 3,535,746 | 10/1970 | Thomas, Jr. | 24/30.5 |
| 3,565,738 | 2/1971 | Kirkpatrick | 161/38 |
| 3,604,066 | 9/1971 | Moon | 24/30.5 R |
| 3,896,991 | 7/1975 | Kozlowski et al. | 229/55 |
| 3,945,086 | 3/1976 | Hoard | 24/30.5 T |
| 3,974,960 | 8/1976 | Mitchell | 229/62 |
| 4,096,202 | 6/1978 | Farnham et al. | 260/873 |
| 4,358,466 | 11/1982 | Stevenson | 426/106 |
| 4,444,949 | 4/1984 | Liu | 525/67 |
| 4,510,287 | 4/1985 | Wu | 525/84 |
| 4,797,313 | 1/1989 | Stolk et al. | 428/150 |
| 4,816,316 | 3/1989 | Robbins | 428/161 |
| 5,154,964 | 10/1992 | Iwai | 428/156 |

*Primary Examiner*—Donald Loney
*Attorney, Agent, or Firm*—Kinney & Lange, P.A.

[57] ABSTRACT

The present invention includes a wireless polymeric twist tie that has a wing portion and at least one rib portion. The polymeric twist tie is formed from a non-metallic polymeric composition. The polymeric twist tie has a tensile strength of greater than 9,000 psi and a yield strength of greater than 9,000 psi when analyzed according to the ANSI D-638 procedure.

6 Claims, 3 Drawing Sheets

WIRELESS POLYMERIC TWIST TIE FORMING PROCESS

This is a divisional of application Ser. No. 08/290,338, filed Aug. 15, 1994, now U.S. Pat. No. 5,607,748.

BACKGROUND OF THE INVENTION

The present invention relates generally to a twist tie fastener. More particularly, the present invention relates to a polymeric twist tie fastener that exhibits superior strength and flexibility characteristics.

Twist ties are used for various fastening and closing purposes. Typically, twist ties are used to seal a package having an open end, such as a bag. To seal the package, packaging material that is adjacent to the open end is gathered. The twist tie is wrapped around the gathered package material until end portions of the twist tie are adjacent to each other. The end portions are then twisted relative to the remainder of the twist tie to fasten the twist tie onto the package.

Twist ties typically include a wire that is enclosed in a paper or plastic wing. Twist ties that include the paper or plastic enclosed wire are subsequently referred to as wire twist ties. Wire twist ties have many advantageous properties that have led to widespread use of wire twist ties. For example, wire twist ties are readily applied using either manual or high speed mechanical operations. In addition, multiple fastening and unfastening cycles do not significantly affect the fastening capability of the wire twist ties. Wire twist ties are also functional over a wide range of temperatures without a significant reduction in fastening capability.

There are many food packaging applications where wire twist ties play an important role because wire twist ties enable consumers to quickly access and reseal a product numerous times. One disadvantage of existing wire twist ties is that consumers desire food packaging that enables heating of the food in its original packaging, such as in a microwave oven. Existing wire twist ties, however, are not suitable for use in a microwave because the wire twist ties generally cause undesirable arcing when the twist tie is subjected to microwave radiation at an intensity that is found in microwave ovens.

Another disadvantage of existing wire twist ties concerns conventional food distribution. When food is commercially packaged for distribution to the public, it is desirable to insure that the food is free from foreign object contamination. Therefore, commercially packaged food is typically inspected after the food is packaged. A common method of inspecting food products is with metal detectors. However, existing wire twist ties preclude the use of metal detectors.

To overcome these difficulties, a variety of non-metallic closures, such as polymeric closures, have been developed. Polymeric twist ties are an example of the polymeric closures. There have been numerous attempts to develop a polymeric twist tie that exhibits desirable toughness and flexibility characteristics while also being easily fastenable and unfastenable over numerous cycles. One such entirely polymeric twist tie is disclosed in Stolk et al., U.S. Pat. No. 4,797,313. Stolk et al. disclose using polymeric materials that provide a yield stress of less than 9,000 psi and preferably between 2,000 psi and 4,000 psi. Stolk et al. indicate that a yield stress of less than 9,000 psi is necessary so that the polymeric materials exhibit a desired glass/rubber transition behavior.

There have been numerous other attempts to provide an entirely polymeric closure device. For example, Thomas, U.S. Pat. No. 3,535,746; Moon, U.S. Pat. No. 3,604,066; and Hoard, U.S. Pat. No. 3,945,086, disclose polymeric closure devices. However, none of these polymeric closure devices are believed suitable for substitution in place of wire twist ties in machinery that presently handles high speed mechanical packaging with wire twist ties.

SUMMARY OF THE INVENTION

The present invention includes a wireless polymeric twist tie that has a wing portion and at least one rib portion. The polymeric twist tie is formed from a non-metallic polymeric composition. The polymeric twist tie has a tensile strength of greater than 9,000 psi and a yield strength of greater than 9,000 psi when analyzed according to the ANSI D-638 procedure.

The present invention further includes a method of forming a wireless polymeric twist tie having a wing portion and at least one rib portion.

DETAILED DESCRIPTION OF THE PREFERRED EMBODIMENTS

Figure 1:
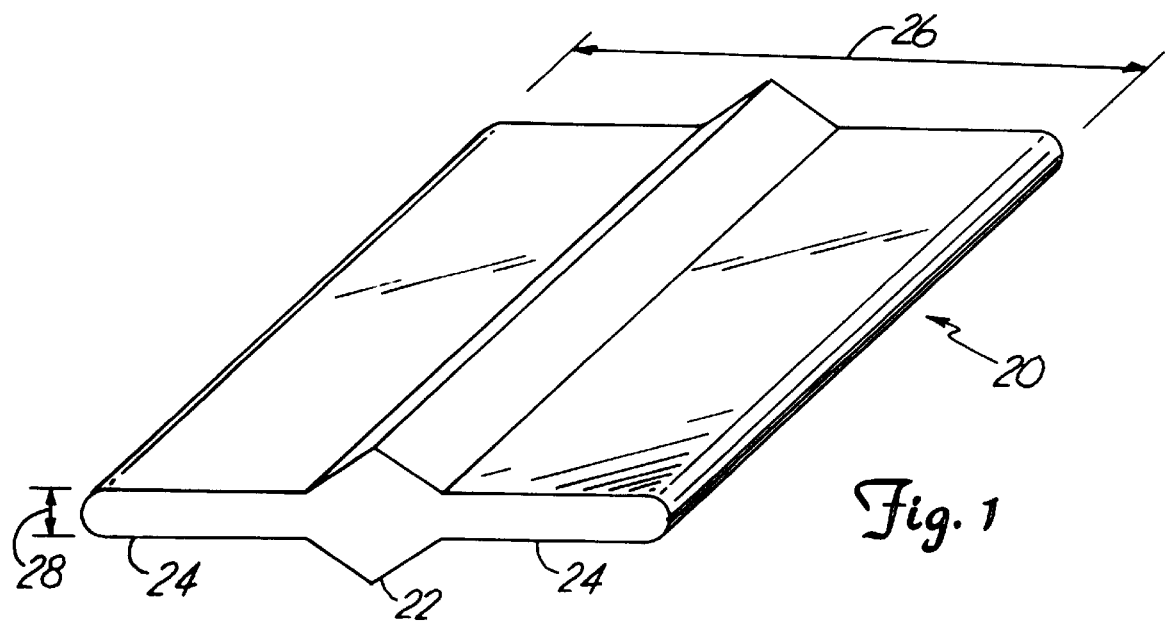
FIG. 1 is a perspective view of a wireless polymeric twist tie of the present invention.

A wireless polymeric twist tie of the present invention is generally illustrated at 20 in FIG. 1. The polymeric twist tie 20 includes both a rib portion 22 and a wing portion 24. The rib portion 22 and the wing portion 24 are preferably constructed from the same material.

The polymeric twist tie 20 has a width 26 of between about 0.125 inches and 0.250 inches. The wing portion 24 has a thickness 28 of between about 0.004 inches and 0.012 inches. The rib portion 22, which is preferably centrally oriented in the polymeric twist tie 20, has a thickness 29 of between about 0.030 inches and 0.125 inches.

Figure 2:
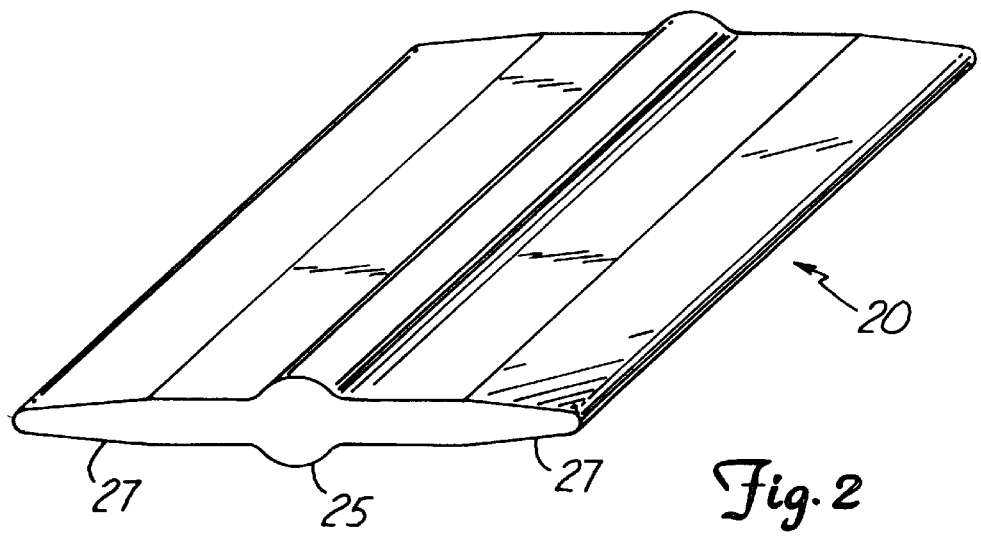
FIG. 2 is a perspective view of an alternative embodiment of the wireless polymeric twist tie of the present invention.

While the polymeric twist tie 20 is depicted as having a rib portion 22 with a square profile and a wing portion 24 with a constant thickness, other profiles can be used based on the desired shape of the polymeric twist tie. For example, a rib portion 25 may have a circular profile and the wing portion 27 may have a tapered profile as illustrated in FIG. 2.

The polymeric twist tie is preferably used to seal a package having an opening at an end. To seal the package, package material that is adjacent to the opening is gathered. The polymeric twist tie is wrapped around the gathered package material until end portions of the polymeric twist tie are adjacent to each other. The end portions are then twisted relative to the remainder of the polymeric twist tie to fasten the twist tie onto the package.

To accomplish the sealing of the package the polymeric twist tie must exhibit several physical characteristics. In particular, the polymeric twist tie must exhibit toughness and flexibility characteristics that are superior to what is exhibited by the prior art polymeric twist ties. The polymeric twist tie of the present invention displays these characteristics. As a result, the polymeric twist tie replicates many of the desirable traits exhibited by wire twist ties, such as retaining a selected position when fastened and being capable of repeated cycles of fastening and unfastening. In addition, the polymeric twist tie is suitable for use with high speed mechanical packaging machines. However, unlike existing wire twist ties, the polymeric twist tie does not pose an arcing hazard when exposed to microwave radiation in a microwave oven.

Another advantage of the polymeric twist tie is that it is readily recyclable because it is entirely constructed from polymeric materials. The wire twist ties, on the other hand, have metallic and paper or plastic components that must be separated prior to recycling.

The polymeric twist tie is preferably constructed from a select blend of polymers that have complementary characteristics. It is believed that the superior performance of the polymeric twist of the present invention results from the unusual combination of polymeric materials used to fabricate the polymeric twist tie.

A compatibilizing agent is preferably added to the polymer blend to enhance the ability of the polymers to blend together. When the compatibilizing agent is used, it is preferably added in an amount that is between 5 and 20 percent by weight of the polymer blend.

Preferably, the polymeric twist tie is constructed from a blend of acrylonitrile butadiene styrene, styrene acrylonitrile, and butadiene styrene copolymer. The acrylonitrile butadiene styrene is between 60 and 80 percent by weight of the blend and preferably 70 percent by weight of the blend. The acrylonitrile butadiene styrene is preferably RX1-6012, which can be obtained from Resin Exchange of Cape Girardeau, Mo. The styrene acrylonitrile is between 10 and 20 percent by weight of the blend and preferably approximately 15 percent by weight of the blend. The styrene acrylonitrile is preferably Tyril 880B, which can be obtained from Dow Plastics of Midland, Mich. The butadiene styrene copolymer is between 10 and 20 percent by weight of the mixture and preferably approximately 15 percent by weight of the mixture. The butadiene styrene copolymer is preferably Stereon 840A, which can be obtained from Firestone Rubber Company of Akron, Ohio.

Another preferred blend of polymers for use in forming the polymeric twist tie is acrylonitrile methyl acrylate copolymer, acrylonitrile butadiene styrene, and acrylic modifier. The acrylonitrile methyl acrylate copolymer is between 40 and 60 percent by weight of the blend and preferably approximately 50 percent by weight of the blend. The acrylonitrile methyl acrylate copolymer is preferably Barex 210, which can be obtained from BP Chemicals of Cleveland, Ohio. The acrylonitrile butadiene styrene is between 25 and 45 percent by weight of the blend and preferably approximately 35 percent by weight of the blend. The acrylonitrile butadiene styrene is preferably RX1-6012, which can be obtained from Resin Exchange of Cape Girardeau, Mo. The acrylic modifier is between 13 and 17 percent by weight of the blend and preferably 15 percent by weight of the blend. The acrylic modifier is preferably Paraloid EXL-3361, which can be obtained from AtoHaas of Philadelphia, Pa.

Other polymers that are suitable for use in forming the polymeric twist tie of with the present invention are listed below. A preferred trade name and manufacturer are indicated in parentheses for each type of polymer: acrylonitrile butadiene styrene (ABS 555, Dow Plastics of Midland, Mich.); polystyrene (MC-3500, Chevron Chemical Co. of Houston, Tex.); high impact polystyrene (EC-2100, Chevron Chemical Co. of Houston, Tex.); and acrylonitrile styrene acrylate (776/SE Luran S, BASF Plastics of Parsippany, N.J.).

Other compatibilizing agents that are suitable for use in forming the polymeric twist tie of the present invention are listed below. A preferred trade name and manufacturer are indicated in parentheses for each type of compatibilizing agent: thermoplastic elastomer (Kraton D-1102 and G-1657X, Shell Chemical Company of Houston, Tex.); and fine particle size, high-strength ceramic microspheres (200, 600, and 850 Zeospheres, Zeelan Industries of St. Paul, Minn.).

The first step in manufacturing the polymeric twist tie is blending the polymeric and compatibilizer components. The components are preferably dry-blended to obtain a homogeneous mixture. The dry-blended mixture is preferably dried using a conventional desiccant bed-type system. After the desiccant drying is completed, nitrogen is purged through the dry-blended mixture to further dry the mixture. A nitrogen blanket is also used to maintain the dry-blended mixture in a dried state prior to extrusion of the dry-blended mixture.

The dry-blended mixture is then fed into an extruder. Selection of an appropriate extruder for extruding acrylonitrile and polystyrene based polymers is known in the art. The extruder preferably has a diameter of 1.5 inches and has a length to diameter ratio of 24:1. When extruding polymeric materials there are several interrelated variables: viscosity of the polymeric material, temperature of extruder heat zones, die size and geometry, and screw rotational speed. However, the most common manner of characterizing extrusion characteristics is melt flow temperature. The term "melt flow temperature" means the approximate temperature of the material being extruded.

The extruder preferably has three barrel heat zones: a flange heat zone, a mixing section heat zone, and a die heat zone. The temperatures in these heat zones are set so that the melt flow temperature is between 370° F. and 420° F. and preferably approximately 390° F. It has been found that maintaining the melt flow temperature between 370° F. and 420° F. results in the maintenance of a desired system pressure between 2000 and 5000 psi. Selection of the appropriate flange, mixing section, and die heat zone temperatures to obtain a melt flow temperatures between 370° F. and 420° F. is known in the art.

To ensure that the components are homogeneously mixed, a motionless mixer, which is also known as a static mixer, is attached to the outlet end of the extruder. The motionless mixer preferably has a diameter of 1.5 inches and a length of 8.75 inches. Preferably, the motionless mixer is an ISG Motionless Mixer, which is available from Ross Engineering of Hauppauge, N.Y.

After exiting the motionless mixer, the blended mixture is extruded through a die. The selection of the size and shape of the die is known in the art and is based on the desired dimensions of the extruded twist tie. Preferably, the die extrudes the mixture at a 90 degree angle with respect to the extruder to facilitate feeding of the twist tie into a water bath.

The size of the water bath is selected based upon the rate at which the mixture is extruded so that the extruded mixture is sufficiently cooled. Preferably, the water bath is approximately eight feet long and is maintained at a temperature of between 10° C. and 27° C.

If the twist tie is not sufficiently cooled, it will obtain a memory when it is wound around a spool. The term "memory" means that the polymeric twist tie will retain a shape. In the case of the spool, the polymeric twist tie will retain a curved shape even after the polymeric twist tie is removed from the spool. However, when the polymeric twist tie is sufficiently cooled prior to winding on the spool, the polymeric twist tie will return to a substantially linear shape after unwinding from the spool.

An important aspect of the present invention is draw down of the extruded twist tie between the die and the water bath. The term "draw down" means a ratio of the width of the polymeric twist tie as it exits the extruder to the width of the polymeric twist tie after the polymeric twist tie has changed from a liquid to a solid state. The draw down causes the polymers in the twist tie to become axially oriented, which results in a polymeric twist tie exhibiting greater values for tensile strength and yield strength.

A set of pull rolls is mounted proximate to an exit end of the water bath to cause draw down of the extruded material. The amount of draw down is determined by the speed of the extruder and the viscosity of the extruded material with relation to the speed of rotation of the pull rolls. Thus, by setting the extruder at a specific rate and varying the rate of rotation of the pull rolls, the amount of draw down is varied. The draw down is between 0.5 and 0.9. Preferably, the draw down is approximately 0.6.

Figure 3:
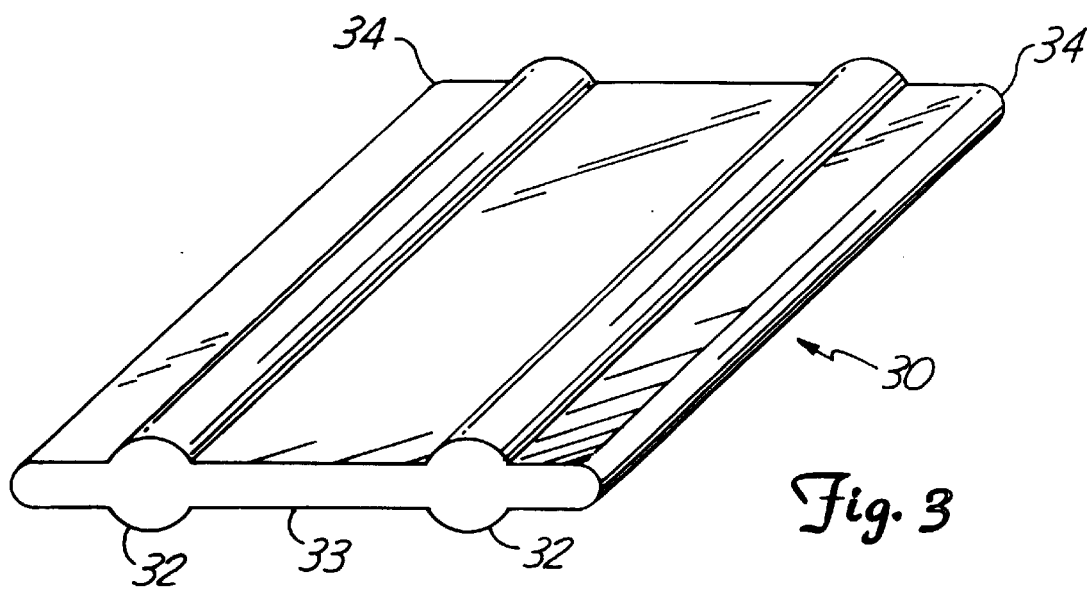
FIG. 3 is a perspective view of a wireless polymeric tin tie of the present invention.

In another embodiment, a modified polymeric twist tie 30 has a plurality of integrally formed rib portions 32 on a wing portion 33 as illustrated in FIG. 3. When two rib portions 32 are integrally formed into the twist tie 30, the twist tie 30 is referred to as a tin tie 30. Each of the rib portions 32 is placed approximately ⅓ of the width of the tin tie 30 from an outer edge 34 of the tin tie 30.

The tin tie is preferably manufactured using the same materials and processes as described for the polymeric twist tie in the first preferred embodiment except that a different die profile is used to extrude the shape.

Figure 4:
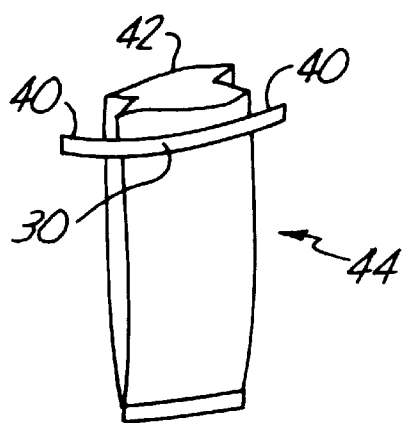
FIG. 4 is a perspective view of the wireless polymeric tin tie of the present invention that is attached to a package.
Figure 5:
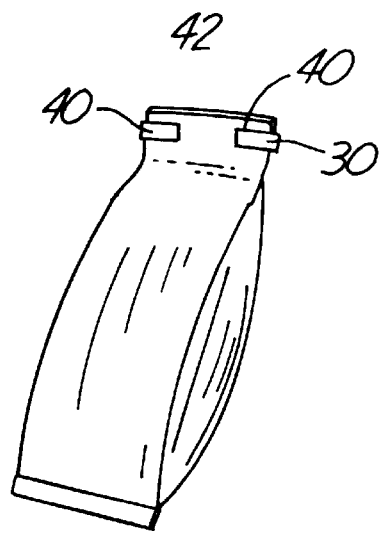
FIG. 5 is a perspective view of the wireless polymeric tin tie of the present invention that is attached to and sealing the package.

The tin tie 30 is preferably attached proximate to an upper edge 42 of a package 44 as illustrated in FIG. 4. Ends 40 of the tin tie 30 are folded to seal the package 44 as illustrated in FIG. 5.

Figure 6:
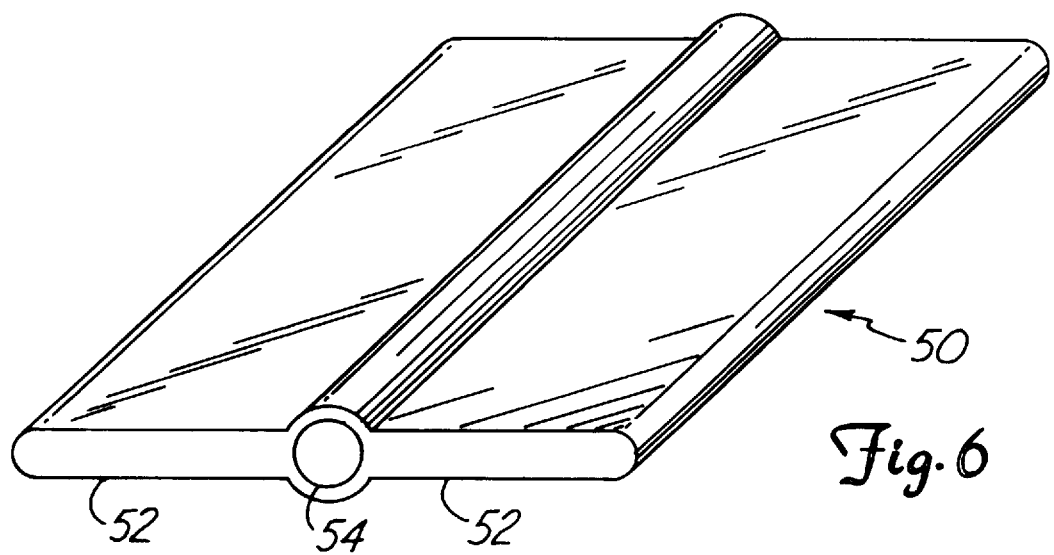
FIG. 6 is a perspective view of an alternative embodiment of the wireless polymeric twist tie of the present invention.

In another alternative embodiment, a polymeric twist tie 50 is formed from a co-extruded material as illustrated in FIG. 6. The term "co-extruded" means that at least two materials are extruded through the die at the same time.

In this embodiment, a wing portion 52 is formed from a first polymeric material and a rib portion 54 is formed from a second polymeric material. By forming the wing portion 54 from a different material than the rib portion 52, polymeric materials are selected to provide the twist tie 50 with an optimum combination of toughness and flexibility.

In this embodiment, the second polymeric composition used to construct the rib portion 54 is preferably more rigid than the first polymeric composition used to construct the wing portion 52. The first and second polymeric compositions may be formed from blends of the same materials. However, the materials in the first and second polymeric compositions are provided in different proportions to produce the polymeric twist tie with physical properties that are more similar to the properties of the wire twist tie.

The first and second polymeric compositions are preferably a blend of acrylonitrile butadiene styrene, styrene acrylonitrile, and butadiene styrene copolymer. The acrylonitrile butadiene styrene is between 45 and 80 percent by weight of the polymeric composition and preferably approximately 70 percent by weight of the polymeric composition. The acrylonitrile butadiene styrene is preferably RX1-6012, which can be obtained from Resin Exchange of Cape Girardeau, Miss. The styrene acrylonitrile is between 10 and 35 percent by weight of the polymeric composition and preferably approximately 15 percent by weight of the polymeric composition. The styrene acrylonitrile is preferably Tyril 880B, which can be obtained from Dow Plastics of Midland, Mich. The butadiene styrene copolymer is between 10 and 35 percent by weight of the polymeric composition and preferably approximately 15 percent by weight of the polymeric composition. The butadiene styrene copolymer is preferably Stereon 840A, which can be obtained from Firestone Rubber Company of Akron, Ohio.

Another preferred blend of polymers for use in first and second polymeric compositions is acrylonitrile methyl acrylate copolymer, acrylonitrile butadiene styrene, and acrylic modifier. The acrylonitrile methyl acrylate copolymer is between 40 and 60 percent by weight of the polymeric composition and preferably approximately 50 percent by weight of the polymeric composition. The acrylonitrile methyl acrylate copolymer is preferably Barex 210, which can be obtained from BP Chemicals of Cleveland, Ohio. The acrylonitrile butadiene styrene is between 15 and 55 percent by weight of the polymeric composition and preferably approximately 35 percent by weight of the polymeric composition. The acrylonitrile butadiene styrene is preferably RX1-6012, which can be obtained from Resin Exchange of Cape Girardeau, Mo. The acrylic modifier is between 10 and 20 percent by weight of the polymeric composition and preferably 15 percent by weight of the polymeric composition. The acrylic modifier is preferably Paraloid EXL-3361, which can be obtained from AtoHaas of Philadelphia, Pa.

The first polymeric composition preferably also includes high-strength ceramic microspheres in a concentration of between 2 and 7 percent by weight of the first polymeric composition. The high-strength ceramic microspheres are preferably 200, 600, or 850 Zeospheres, which can be obtained from Zeelan Industries of St. Paul, Minn.

The second polymeric composition preferably includes a greater percentage of compatibilizer to make the wing portions more flexible. The compatibilizing agents include styrene acrylonitrile, butadiene styrene copolymer, and acrylic modifier.

The process of manufacture described with respect to the first preferred embodiment is used in forming the polymeric twist tie according to this embodiment. However, the first and second polymeric compositions are fed through separate extruders to the die. Selection of the appropriate extruders and die design for performing co-extrusion is known in the art.

Another advantage of co-extruding the polymeric twist tie is that the physical properties of the twist tie can be varied by changing the ratio of the first polymeric composition to the second polymeric composition. Such a change could be useful to customize the polymeric twist tie for a specific use, such as higher stress or maintaining a desired degree of flexibility during colder or warmer use temperatures.

Figure 7:
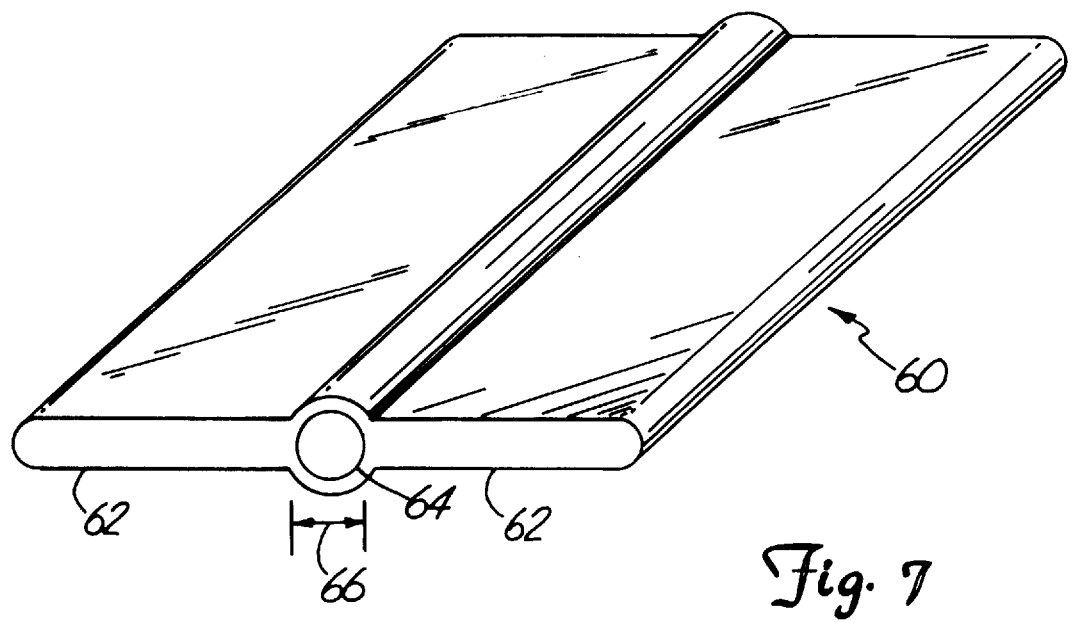
FIG. 7 is a perspective view of an alternative embodiment of the wireless polymeric twist tie of the present invention.

In another embodiment, the polymeric twist tie 60, such as the one illustrated in FIG. 7, is sequentially formed using a two-step process such that a wing portion 62 is distinct from a rib portion 64. In this embodiment, the rib portion 64 is extruded and then the wing portion 62 is extruded over the rib portion 64. By forming the wing portion from a first polymeric composition and the rib portion 64 form a second polymeric compositions, materials can be selected to provide the twist tie 60 with an optimum combination of toughness and flexibility that is more similar to a wire twist tie.

The wing portion 62 is preferably constructed from a blend of acrylonitrile butadiene styrene, styrene acrylonitrile, and butadiene styrene copolymer. The acrylonitrile butadiene styrene is between 45 and 80 percent by weight of the first polymeric composition and preferably approximately 70 percent by weight of the first polymeric composition. The acrylonitrile butadiene styrene is preferably RX1-6012, which can be obtained from Resin Exchange of Cape Girardeau, Mo. The styrene acrylonitrile is between 10 and 35 percent by weight of the first polymeric composition and preferably approximately 15 percent by weight of the first polymeric composition. The styrene acrylonitrile is preferably Tyril 880B, which can be obtained from Dow Plastics of Midland, Mich. The butadiene styrene copolymer is between 10 and 35 percent by weight of the first polymeric composition and preferably approximately 15 percent by weight of the first polymeric composition. The butadiene styrene copolymer is preferably Stereon 840A, which can be obtained from Firestone Rubber Company of Akron, Ohio.

Another preferred blend of polymers for use in first and second polymeric compositions is acrylonitrile methyl acrylate copolymer, acrylonitrile butadiene styrene, and acrylic modifier. The acrylonitrile methyl acrylate copolymer is between 40 and 60 percent by weight of the first polymeric composition and preferably approximately 50 percent by weight of the first polymeric composition. The acrylonitrile methyl acrylate copolymer is preferably Barex 210, which can be obtained from BP Chemicals of Cleveland, Ohio. The acrylonitrile butadiene styrene is between 15 and 55 percent by weight of the first polymeric composition and preferably approximately 35 percent by weight of the first polymeric composition. The acrylonitrile butadiene styrene is preferably RX1-6012, which can be obtained from Resin Exchange of Cape Girardeau, Mo. The acrylic modifier is between 10 and 20 percent by weight of the first polymeric composition and preferably 15 percent by weight of the first polymeric composition. The acrylic modifier is preferably Paraloid EXL-3361, which can be obtained from AtoHaas of Philadelphia, Pa.

The first polymeric composition preferably also includes high-strength ceramic microspheres in a concentration of between 2 and 7 percent by weight of the first polymeric composition. The high-strength ceramic microspheres are preferably 200, 600, or 850 Zeospheres, which can be obtained from Zeelan Industries of St. Paul, Minn.

The second polymeric composition can be formed from the preferred materials set forth for use with the first polymeric composition but which have been modified to exhibit greater flexibility by the addition of compatibilizers. The second polymeric composition can also be a blend of high impact polystyrene and butadiene styrene copolymer. The high impact polystyrene is between 50 and 70 percent by weight of the blend and preferably 60 percent by weight of the blend. The high impact polystyrene is preferably EC-2100, which can be obtained from Chevron Chemical Company of Houston, Tex. The butadiene styrene copolymer is between 30 and 50 percent by weight of the blend and preferably 40 percent by weight of the blend. The butadiene styrene copolymer is preferably Stereon 840A, which can be obtained from Firestone Rubber Company of Akron, Ohio.

The second polymeric composition can also be a blend of acrylonitrile butadiene styrene and thermoplastic elastomer. The acrylonitrile butadiene styrene is between 55 and 75 percent by weight of the blend and preferably 65 percent by weight of the blend. The acrylonitrile butadiene styrene is preferably RX1-6012, which can be obtained from Resin Exchange of Cape Girardeau, Mo. The thermoplastic elastomer is between 25 and 45 percent by weight of the blend and preferably 35 percent by weight of the blend. The thermoplastic elastomer is preferably Kraton G-1657x, which can be obtained from Shell Chemical Company of Houston, Tex.

The second polymeric composition can also be formed from the materials listed below. A preferred trade name and manufacturer are indicated in parentheses for each polymer: chlorinated polyethylene (Tyrin CM0136, Dow Chemical Company of Midland, Mich.), polyurethane elastomer (Pellethane 2102-90a, Dow Chemical Company of Midland, Mich.), low density polyethylene (4005, Dow Chemical Company of Midland, Mich.), adhesive polymer (Primacor 1320, Dow Chemical Company of Midland, Mich.), polypropylene (Tenite 4G7DP, Eastman Chemical Company of Kingsport, Tenn.), and polyvinyl chloride (Geon 82024, BFGoodrich Company of Brecksville, Ohio).

Although the rib portion 64 may be extruded to have any desired cross-sectional profile, the rib portion 64 is preferably extruded to have a circular profile. A diameter 66 of the rib portion 64 is preferably between approximately 0.015 and 0.045 inches.

After the rib portion 64 is cooled and wound around a spool, the rib portion 64 is drawn through a coating die that has a profile of the desired wing con figuration This process produces a coating in the shape of the wing portion 62 on the rib portion 64 in the shape of the desired polymeric twist tie. The use of a coating die is known in the art.

There are several tests that are used to characterize the performance of the polymeric twist tie. These tests include: a tensile strength test, a yield strength test, a dead fold test, an alternating dead fold test, a re-tie test, and a non-traditional tensile test.

The tensile strength and the yield strength of the polymeric twist tie are measured using a tensile test performed according to the ANSI D-638 standard. The polymeric twist tie of the present invention exhibits a tensile strength of greater than 9,000 psi and preferably greater than 19,000 psi. The polymeric twist tie exhibits a yield strength of greater than 9,000 psi and preferably greater than 19,000 psi.

The dead fold test measures the degree of memory a blend exhibits when it is folded 180 degrees. The term "memory" means the ability of the polymeric twist tie to remain in a position when the polymeric twist tie is formed into the position. In this test, a sample is folded approximately in half so that the end portions of the polymeric twist tie are approximately adjacent to each other. After relaxing for three minutes at room temperature, the angle of relaxation is obtained by measuring an included angle between the end portions. The polymeric twist tie of the present invention exhibits a dead fold angle of less than 30 degrees and preferably less than 10 degrees.

The alternating dead fold test determines how many times the polymeric twist tie can survive an alternating 180 degree fold. The alternating 180 degree fold is an especially important characteristic when the polymeric twist tie is used as a tin tie. For this test, a sample of the polymeric twist tie is folded until end portions of the polymeric twist tie are approximately adjacent to each other. Then, the polymeric twist tie sample is folded in the opposite direction. The alternating dead fold is repeated ten times. It is believed that ten cycles of alternating dead fold is greater than what would be expected under typical use conditions. The alternating dead fold test does not cause noticeable degradation of the polymeric twist tie of the present invention.

The re-tie test is used to manually verify that a sample can be tied and untied around a one inch diameter pin at least ten times. When fastening the twist tie, end portions are twisted three complete revolutions. It is believed that fastening and unfastening the twist tie ten times is greater than what would be expected under ordinary conditions. The polymeric twist tie of the present invention exhibits the ability to be tied and untied at least ten times without noticeable degradation of the twist tie.

The non-traditional tensile test examines an ability of the polymeric twist tie to resist breakage when it is tied around two pins that are forced apart. The non-traditional tensile test also examines the ability of the polymeric twist tie to remain tied when the pins are forced apart.

This test is performed using a JJ model T5001 tensile tester manufactured by JJ Lloyd Instruments Limited of Warsash, South Hampton, England. The pins are mounted on the tensile tester for movement relative to each other. The polymeric twist tie is placed around the pins so that the polymeric twist tie encircles the pins. End portions of the polymeric twist tie are then twisted three complete revolutions to fasten the twist tie around the pins. The pins are then pulled apart and the force needed to break the twist tie is measured. The non-traditional tensile test force measured for the polymeric twist tie of the present invention is greater than 5 psi and preferably greater than 4 psi.

The polymeric twist tie of the present invention is described with reference to the following examples. These examples are provided as an illustration of the invention and are not intended to limit the invention.

EXAMPLE 1

In this example, acrylonitrile butadiene styrene (RX1-6012), styrene acrylonitrile (Tyril 880B), and butadiene styrene polymer (Stereon 840A) are dry blended in an amount that is 66 percent by weight, 16 percent by weight, and 16 percent by weight, respectively, of the blended material. The dry blended mixture was then dried using a conventional desiccant bed-type system. Next, the dry-blended mixture was fed into an extruder having a diameter of 1.5 inches and a length to diameter ratio of 24:1. The extruded form of the polymeric twist tie in this example was substantially the same as the polymeric twist tie illustrated in FIG. 1.

The temperatures in the extruder were maintained so that the melt flow temperature of the blended material was maintained at approximately 390° F. Upon exiting the extruder, the blended material passed through a motionless mixer and then through a die. The mixture was then drawn down 60 percent before being cooled in the water bath.

The tensile strength and the yield strength of the polymeric twist tie was analyzed according to ANSI D-638 standard. A non-traditional tensile test was performed using a JJ model T501 tensile tester. Pins are mounted on the tensile tester for movement relative to each other. Polymeric twist tie is placed around the pins, until the end portions of the polymeric twist tie are approximately adjacent to each other. The end portions of the polymeric twist tie are then twisted three complete revolutions to fasten the twist tie around the pins. The pins are then pulled apart and the force needed to break the twist tie was measured.

The polymeric twist tie was examined using a dead fold test. The sample of the polymeric twist tie was folded approximately in half until end portions of the polymeric twist tie are approximately adjacent to each other. The sample was allowed to relax for 3 minutes and an included angle between the end portions was measured to determine the dead fold angle.

The re-tie test was performed by placing a sample of the polymeric twist tie around a 1 inch diameter pin until end portions of the polymeric twist tie are approximately adjacent to each other. The end portions are then twisted three complete revolutions to fasten the polymeric twist tie around the pin. The end portions are then untwisted to unfasten the polymeric twist tie from the pin to complete one repetition of the re-tie test.

The alternating dead fold test was performed by folding a sample of the polymeric twist tie until end portions of the polymeric twist tie are approximately adjacent to each other. Then, the polymeric twist tie sample was folded in the opposite direction to complete one repetition.

The results of these tests are reported in Table 1. An asterisk ("*") is used in Table 1 to indicate that the sample was not analyzed using the corresponding test.

The polymeric twist tie exhibited tensile strengths that average greater than 18,400 psi and yield strengths that average greater than 19,600 psi. The polymeric twist tie samples also exhibited an average elongation value of greater than 61 percent. The values for tensile strength, yield strength, and elongation all indicate that the polymeric twist exhibits physical characteristics that are superior to prior art polymer twist ties.

Only Sample 2 was examined using the Non-Traditional Tensile Test. This sample exhibited reading of 9.05 in this test. This value indicates that the polymeric twist tie not only exhibits a good resistance to breakage when stretched but also exhibits a good resistance to untying when stretched.

The dead fold relaxation angle for the samples averaged 10°. The dead fold angle is indicative of the ability of the twist tie to remain tied around an object after the twist tie is tied around the object. The value for the polymeric twist tie indicates that the polymeric twist tie exhibits a good ability to remain tied around an object.

Samples 1 and 3 were able to be re-tied 10 times without failure. One of the ends of Sample 2 broke after 3 repetitions of the re-tie test. However, the remaining portion of the sample was readjusted and retested. Upon retesting, the polymeric twist tie was able to be re-tied 10 times without breaking. Thus, the polymeric twist tie generally exhibited the ability to be re-tied 10 times, which is greater than what is commonly seen during a typical life span of a twist tie.

Each of the samples was alternatingly dead folded 10 times without breaking. Thus, the polymeric twist tie of the present invention displays characteristics that exceed the conditions that are commonly seen during a typical life span of a twist tie.

TABLE 1

Physical Properties of
Polymeric Twist Tie Blend

| | Sample Number | | |
|---|---|---|---|
| | 1 | 2 | 3 |
| Tensile Strength (psi) | 16,853 | 19,083 | 19,380 |
| Yield Strength (psi) | 19,264 | 19,425 | 20,157 |

TABLE 1-continued

Physical Properties of
Polymeric Twist Tie Blend

|  | Sample Number | | |
| --- | --- | --- | --- |
|  | 1 | 2 | 3 |
| Elongation (%) | 52.4 | 67.2 | 65.9 |
| Non-Traditional Tensile Test (psi) | * | 9.05 | * |
| Dead Fold Relaxation Angle | 8° | 10° | 12° |
| Re-Tie | 10 | 3 | 10 |
| Alternating Dead Fold | 10 | 10 | 10 |

EXAMPLE 2

In this example, acrylonitrile methyl acrylate copolymer Barex 210) was blended with acrylonitrile butadiene styrene (RX1-6012) and acrylic modifier (Paraloid EXL-3361) in an amount that is 84 percent by weight, and 16 percent by weight, respectively, of the blended material. The blended material was then extruded as described in Example 1 to form a polymeric twist tie. The extruded form of the polymeric twist tie in this example was substantially the same as the polymeric twist tie illustrated in FIG. 2.

Three samples of the polymeric twist tie were then analyzed using the tests in Example 1. The results of these tests are reported in Table 2. An asterisk ("*") is used in Table 2 to indicate that the sample was not analyzed using the corresponding test.

The polymeric twist tie exhibited tensile strengths that average greater than 10,000 psi and yield strengths that average greater than 12,000 psi. Thus, the polymeric twist ties exhibit superior strength to prior art polymeric twist ties. Samples 1 and 2 exhibited tensile and yield strengths that were each at least 69% greater than the tensile and yield strengths exhibited by Sample 3. It is believed that Sample 3 exhibited lower tensile and yield strengths because the draw down was done at a smaller ratio than for the other samples.

The polymeric twist tie samples exhibited an average elongation of greater than 53 percent. Thus, the polymeric twist tie is capable of elongating to a substantial degree prior to breaking.

The average value for the polymeric twist ties that were tested with the non-traditional tensile test was 6.31 psi. While the average value is not as great as the value exhibited by the polymeric twist tie in Example 1, the data indicates that this polymeric twist tie is also resistant to breakage when stretched and resists untying when stretched.

The dead fold relaxation angle for the polymeric twist tie averaged 1°, which is superior to the performance exhibited by the polymeric twist tie in Example 1. Thus, the polymeric twist tie exhibits an excellent ability to remain tied around an object after being tied around the object.

Only Samples 2 and 3 were examined for re-tie characteristics. The samples were re-tied 7 and 8 times, respectively, prior to breaking. While not exhibiting the ability to be re-tied 10 times, which is greater than what is commonly seen during the life span of a twist tie, the samples were able to withstand a number of ties before breaking.

Each of the samples was alternatingly dead folded 10 times without breaking. Thus, the polymeric twist tie of the present invention displays characteristics that exceed the conditions that are commonly seen during a typical life span of a twist tie.

TABLE 2

Physical Properties of
Polymeric Twist Tie Blend

|  | Sample Number | | |
| --- | --- | --- | --- |
|  | 1 | 2 | 3 |
| Tensile Strength (psi) | 11,098 | 12,826 | 6,532 |
| Yield Strength (psi) | 15,115 | 13,923 | 7,975 |
| Elongation (%) | 48.2 | 63.1 | 49.5 |
| Non-Traditional Tensile Test (psi) | 5.99 | 5.27 | 7.68 |
| Dead Fold Relaxation Angle | 1° | 0° | 2° |
| Re-Tie | * | 7 | 8 |
| Alternating Dead Fold | 10 | 10 | 10 |

Although the present invention has been described with reference to preferred embodiments, workers skilled in the art will recognize that changes may be made in form and detail without departing from the spirit and scope of the invention.

What is claimed is:

1. A method of forming a wireless polymeric twist tie having a rib portion and at least one wing portion, the method comprising the steps of:

preparing a first non-metallic polymeric composition;

preparing a second non-metallic polymeric composition;

extruding the first polymeric composition to form the rib portion of the wireless polymeric twist tie; and extruding the second polymeric composition to form the wing portion of the wireless polymeric twist tie.

2. The method of claim 1 wherein the first polymeric composition and the second polymeric composition are simultaneously extruded to form the rib portion and the wing portion, respectively.

3. The method of claim 1 wherein the first polymeric composition is extruded to form the rib portion and then the second polymeric composition is extruded over at least a portion of the rib portion to form the wing portion.

4. The method of claim 1 wherein the second polymeric composition is extruded such that the wing portion substantially covers the rib portion.

5. The method of claim 1 and further comprising the step of drawing down the first polymeric composition in the rib portion.

6. The method of claim 1 and further comprising the step of drawing down the second polymeric composition in the wing portion.

* * * * *